Dec. 21, 1965   F. V. SCIGLIANO   3,224,091
STIRRING SPOON WITH SCRAPING MEANS
Filed May 25, 1964

INVENTOR.
FRANK V. SCIGLIANO
BY *James G. O'Boyle*
ATTORNEY

United States Patent Office 3,224,091
Patented Dec. 21, 1965

3,224,091
STIRRING SPOON WITH SCRAPING MEANS
Frank V. Scigliano, 176 Vinal St., Revere, Mass.
Filed May 25, 1964, Ser. No. 369,840
1 Claim. (Cl. 30—142)

This invention relates to a spoon, and more particularly to an improved stirring spoon constructed and arranged to engage the flat bottom of a pan to facilitate the stirring of the contents therein.

Heretofore, many types of stirring spoons have been devised to prevent food, such as, soups, gravies, and the like, from sticking to the bottom of the pan in which the food is cooking. One such proposed stirring spoon includes a straight edge rigidly connected to or integrally formed on the end of the spoon. While this type of stirring spoon is satisfactory for its intended purpose, that is, for stirring food in large kettles, vats, and the like, it is subject to certain objections when used in smaller pots or pans. When using stirring spoons having integrally connected straight edges, it has been found that during the stirring action, particularly in the case of small pots or pans, the spoon straight edge does not maintain continuous engagement with the pan bottom, with the result that food being cooked in the pan tends to stick to the bottom thereof.

In order to overcome the disadvantages in known types of stirring spoons, the spoon of the present invention has been devised wherein a straight edged member is pivotally connected to the end of the spoon on the curved edge of the spoon bowl whereby the straight edge maintains contact with the bottom of the pan during the stirring action to thereby prevent the sticking of the food on the bottom of the pan.

An object of the invention is to provide an improved stirring spoon for use in stirring food while being cooked in large kettles, vats, and the like, as well as in smaller pots and pans.

Another object of the invention is to provide an improved stirring spoon having a straight-edged member pivotally connected to the spoon bowl whereby the straight edge maintains line contact with the bottom of the pan during the stirring action to thereby prevent the sticking and concomitant burning of the food on the bottom of the pan.

Yet another object of the invention is to provide an improved stirring spoon characterized by its simplicity in design, ruggedness in construction and which is not likely to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

Figure 1:
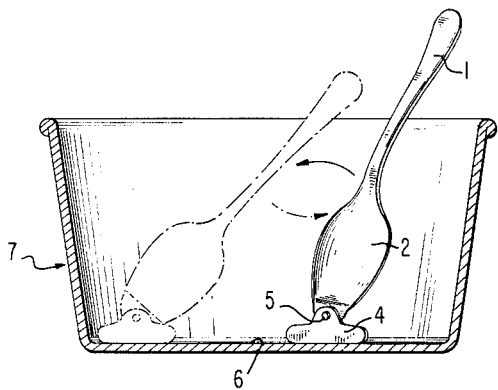
FIGURE 1 is a perspective view of the stirring spoon of the present invention, showing the position of the spoon relative to the flat bottom of a pan during the stirring action.
Figure 2:
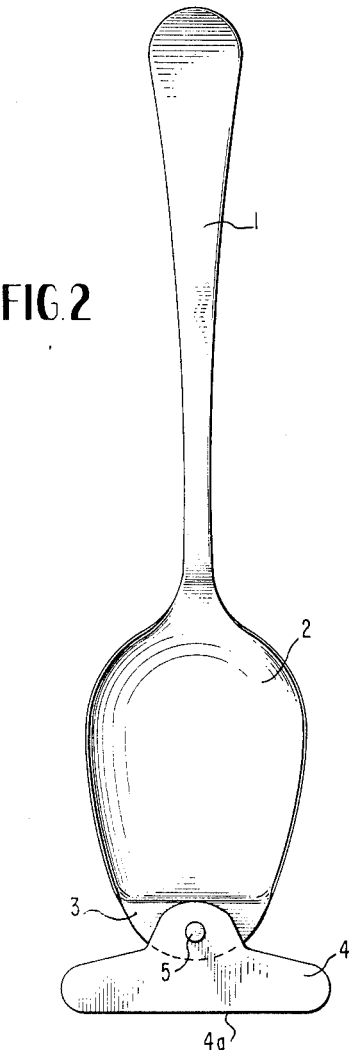
FIGURE 2 is a front elevational view of the stirring spoon.
Figure 3:
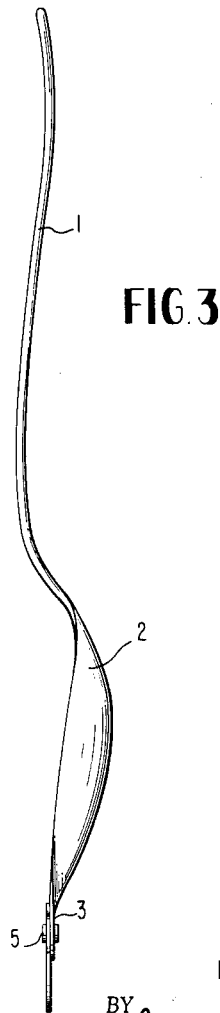
FIGURE 3 is a side elevational view of the spoon.

Referring to the drawings and more particularly to FIGURES 2 and 3 thereof, the stirring spoon of the present invention comprises a handle 1 integrally connected to an oval shaped bowl portion 2, the end of which terminates in a lip portion 3 having a depending member 4 pivotally connected thereto by means of a pin 5. Member 4 is provided with a straight edge 4a at the lower end thereof which is adapted to engage the flat bottom 6 of a pan 7, as shown in FIGURE 1.

The stirring action employed for stirring foods in small pots or pans is usually of the type wherein an imaginary cone is generated in which the spoon acts as the generatrix with the vertex being the point at which the spoon is grasped by the user. By pivotally connecting member 4 to the end of the spoon, the straight edge 4a will always remain in contact with the pan bottom which would be coextensive with the base of the "cone."

In order to maintain an integrally connected straight edge in line contact with the bottom of a pan, it is necessary to move the spoon in a circular path thereby generating an imaginary cylinder. This type of stirring action is usually employed when stirring food in large kettles, vats, and the like, whereas, the "conical-type" stirring action is employed when using smaller pots and pans. Thus, with the straight edged member being rigidly connected to or integrally formed on the end of the spoon, as hitherto employed, it will be readily seen that during the "conical-type" stirring motion the straight edge would tilt with the spoon, with the result that only point contact rather than line contact is maintained with the bottom of the pan.

Therefore, by pivotally connecting the straight edge member to the end of the spoon the usefulness of the spoon as a stirring spoon is greatly enhanced since the straight edge 4a of the pivotal member 4 will always be in line contact with the bottom of the receptacle whether it be a small pot or pan, or large vat or kettle, and regardless of the type of stirring motion employed. It will also be appreciated that the pivotal straight-edged member 4 may be employed on spoons of various sizes including the larger ones usually having perforated bowl portions.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claim.

I claim:

A stirring spoon of the character described comprising, a spoon bowl, a handle integrally connected to one edge of said spoon bowl, an integral lip portion formed on the opposite edge of said bowl, a member having a straight-edge, a pin extending through said member and said lip portion for freely pivoting said straight-edged member to the spoon bowl, the straight-edge of said member being on the side opposite from the pivot whereby during the stirring action, the straight-edge of said member maintains line contact with the bottom of the receptacle to thereby prevent the contents of the receptacle from sticking to the bottom thereof.

References Cited by the Examiner
UNITED STATES PATENTS

| | | | |
|---|---|---|---|
| 1,477,653 | 12/1923 | De La Barre | 30—169 X |
| 2,589,753 | 3/1952 | Vinson | 30—169 X |

WILLIAM FELDMAN, *Primary Examiner*
R. V. PARKER, JR., *Assistant Examiner.*